(12) United States Patent  
Fu et al.

(10) Patent No.: US 9,176,915 B2  
(45) Date of Patent: Nov. 3, 2015

(54) DATA STORAGE DEVICE CARRIER SYSTEM

(75) Inventors: Chi-Chang Fu, Banciao (TW); Kuo Ching Huang, Taipei (TW); Feng-Cheng Su, Chiayi County (TW); Jason Alan Yelinek, Diamond Bar, CA (US)

(73) Assignee: Dell Products L.P., Round Rock, TX (US)

( * ) Notice: Subject to any disclaimer, the term of this patent is extended or adjusted under 35 U.S.C. 154(b) by 1830 days.

(21) Appl. No.: 12/433,544

(22) Filed: Apr. 30, 2009

(65) Prior Publication Data

US 2010/0281199 A1 Nov. 4, 2010

(51) Int. Cl.  
*G06F 13/12* (2006.01)  
*G06F 13/40* (2006.01)

(52) U.S. Cl.  
CPC .............. *G06F 13/409* (2013.01); *G06F 13/12* (2013.01)

(58) Field of Classification Search  
USPC ................. 710/62–64, 72, 74, 300–304, 305; 361/679.02, 679.37, 679.39  
See application file for complete search history.

(56) References Cited

U.S. PATENT DOCUMENTS

| | | | |
|---|---|---|---|
| 5,579,204 A * | 11/1996 | Nelson et al. | 361/679.32 |
| 5,790,374 A * | 8/1998 | Wong | 361/679.32 |
| 6,931,457 B2 * | 8/2005 | Bissessur et al. | 710/14 |
| 6,970,352 B2 | 11/2005 | Record et al. | |
| 7,275,935 B2 * | 10/2007 | Chen et al. | 439/61 |
| 7,307,836 B2 | 12/2007 | Scicluna et al. | |
| 7,597,582 B2 * | 10/2009 | Nehling et al. | 439/490 |
| 2006/0139854 A1 * | 6/2006 | Beyers et al. | 361/600 |
| 2007/0197100 A1 * | 8/2007 | Tsao | 439/638 |
| 2008/0172527 A1 * | 7/2008 | Hsu | 711/114 |
| 2008/0191590 A1 * | 8/2008 | Lin et al. | 312/223.2 |
| 2009/0274027 A1 * | 11/2009 | Tanaka et al. | 369/47.55 |

* cited by examiner

*Primary Examiner* — Khanh Dang  
(74) *Attorney, Agent, or Firm* — Haynes and Boone, LLP

(57) ABSTRACT

A data storage device carrier system includes a carrier configured to support one or more data storage devices, a backplane, including one or more coupling connector devices configured to electrically couple with a motherboard, and an interposer board operable to couple a plurality of the data storage devices supported by the carrier with the backplane. In an embodiment, the one or more coupling connector devices are operable to transfer communication signals and electrical power. The interposer board is operable to provide the electrical power from a single port on the backplane to each of the plurality of the data storage devices. The interposer board is also operable to pass communication signals between a primary port on the backplane to a first one of the plurality of the data storage devices, and to pass communication signals between a secondary port on the backplane to a second one of the plurality of the data storage devices.

20 Claims, 9 Drawing Sheets

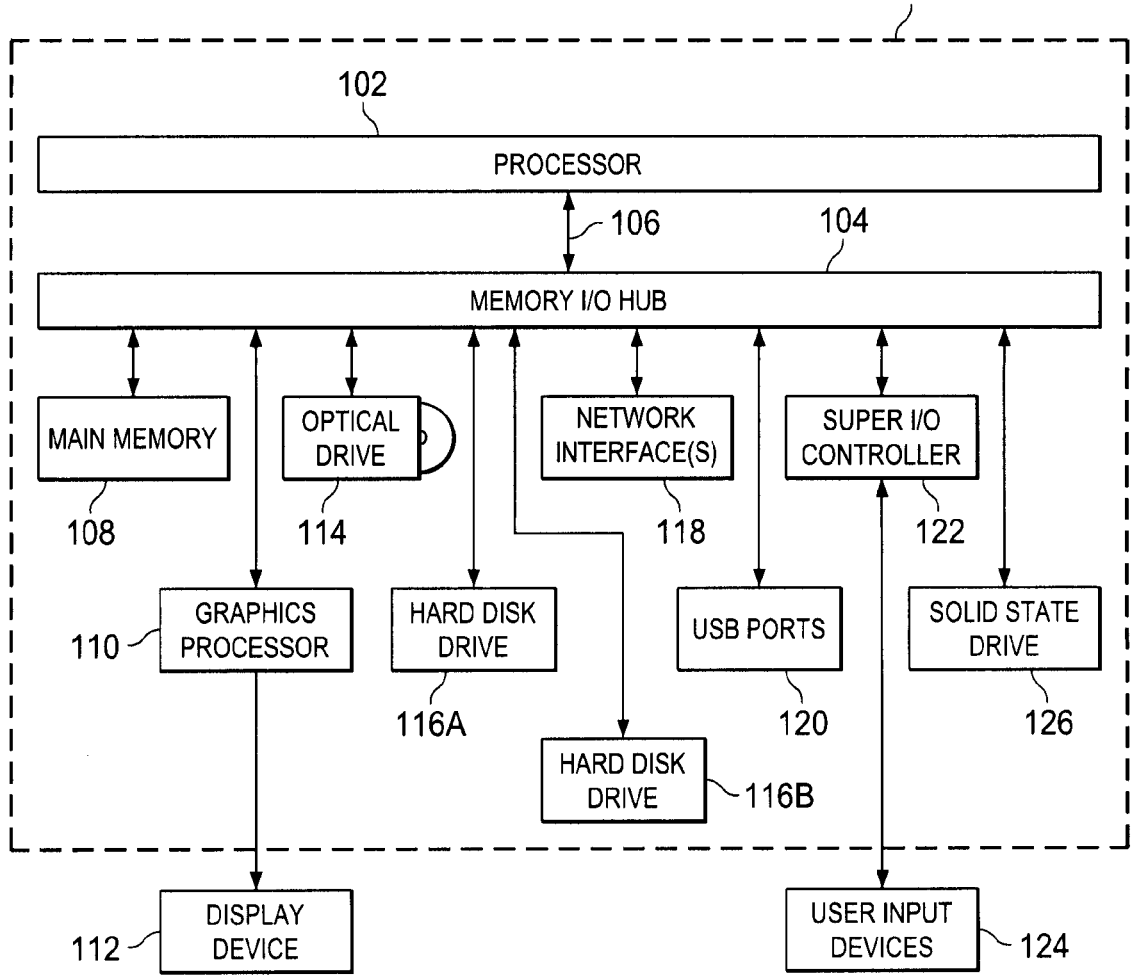

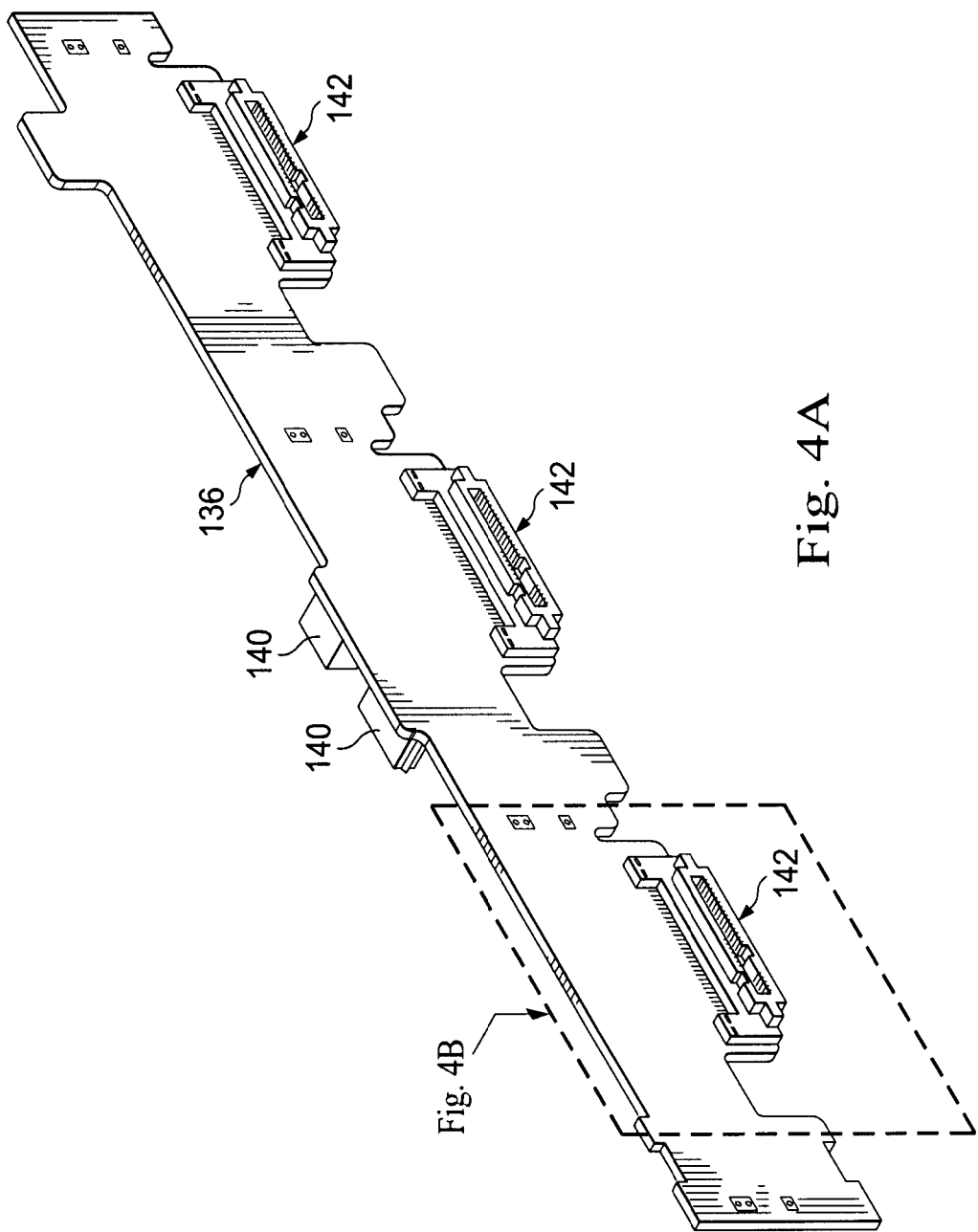

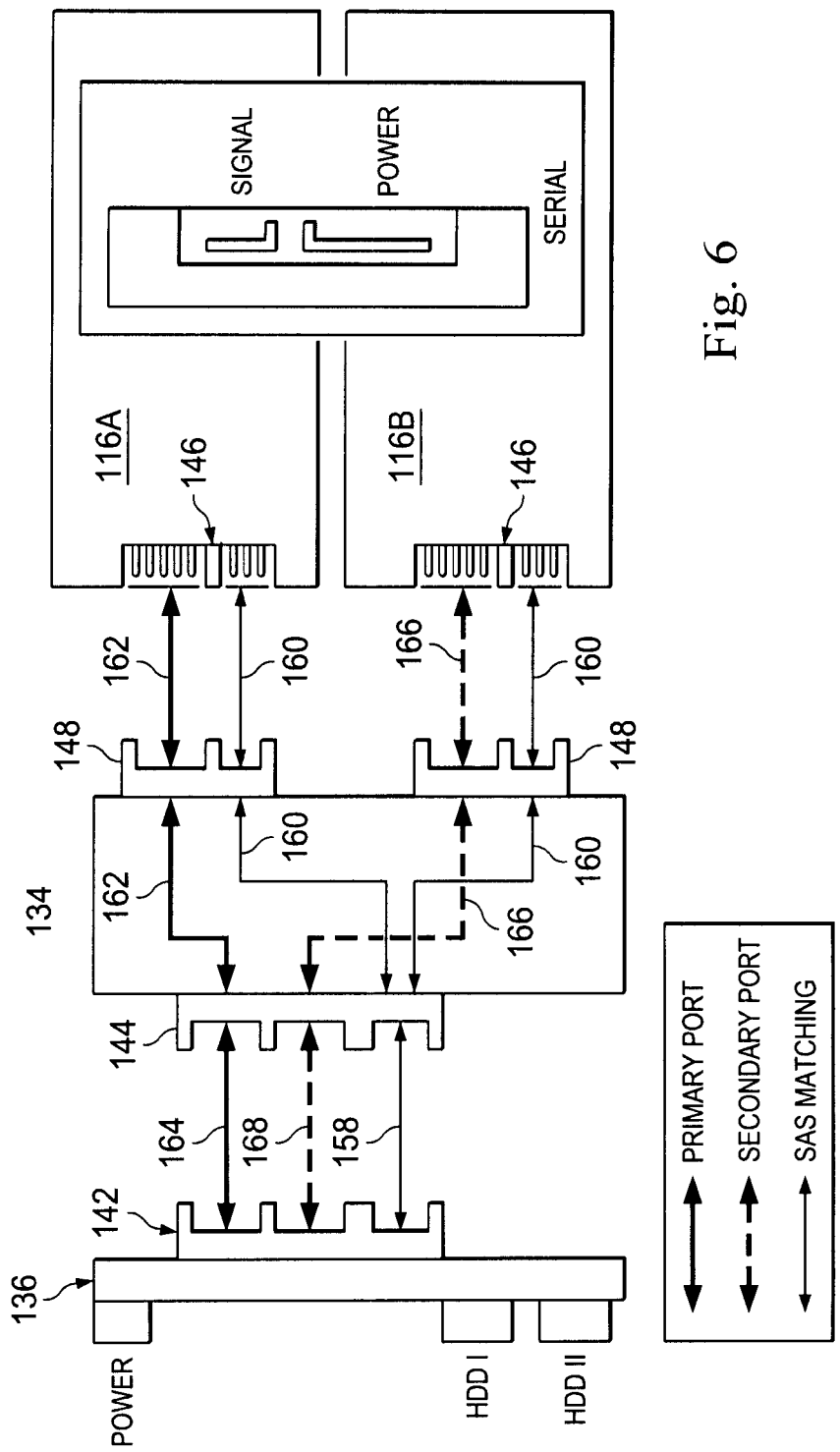

DATA STORAGE DEVICE CARRIER SYSTEM

BACKGROUND

The present disclosure relates generally to information handling systems, and more particularly to a data storage device carrier system to couple multiple data storage devices with an information handling system backplane.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be configured with a variety of different hardware and software features. For example, an IHS may be configured to use different sized data storage devices, such as different sized hard disk drives (HDDs). Due to the size difference of different sized data storage devices (e.g., 2.5" HDDs & 3.5" HDDs), there are usually different HDD carriers and backplanes to couple the data storage devices with the backplanes, depending on the size and configuration of the respective data storage device. This can be seen in the prior art figures shown in FIGS. 1A and 1B. As should be readily understood, different backplanes for the different sizes of data storage devices are generally not compatible with other sizes and configurations of data storage devices. As such, If an IHS manufacturer offers an option of using different data storage devices (e.g., 2.5" and 3.5" HDDs) in an IHS, the manufacturer has to develop, test and inventory different configurations of carriers and/or backplanes for the different configurations available. In other words, allowing different sizes of data storage devices requires an IHS manufacturer to develop and test different backplanes and different chassis HDD carriers for each different size and combination of data storage device allowed.

Accordingly, it would be desirable to provide an improved data storage device carrier system operable to couple multiple data storage devices with a common IHS backplane.

SUMMARY

According to one embodiment, a data storage device carrier system includes a carrier configured to support one or more data storage devices, a backplane, including one or more coupling connector devices configured to electrically couple with a motherboard, and an interposer board operable to couple a plurality of the data storage devices supported by the carrier with the backplane. In an embodiment, the one or more coupling connector devices are operable to transfer communication signals and electrical power. The interposer board is operable to provide the electrical power from a single port on the backplane to each of the plurality of the data storage devices. The interposer board is also operable to pass communication signals between a primary port on the backplane to a first one of the plurality of the data storage devices, and to pass communication signals between a secondary port on the backplane to a second one of the plurality of the data storage devices.

BRIEF DESCRIPTION OF THE DRAWINGS

FIG. 2 illustrates a block diagram of an embodiment of an information handling system (IHS).

FIGS. 4A and 4B illustrate isometric views of an embodiment of a common backplane used to couple multiple data storage devices with a motherboard in an IHS.

FIG. 6 illustrates a block schematic diagram for an embodiment of communications for coupling multiple data storage devices with a backplane using an interposer.

DETAILED DESCRIPTION

Figure 1A:
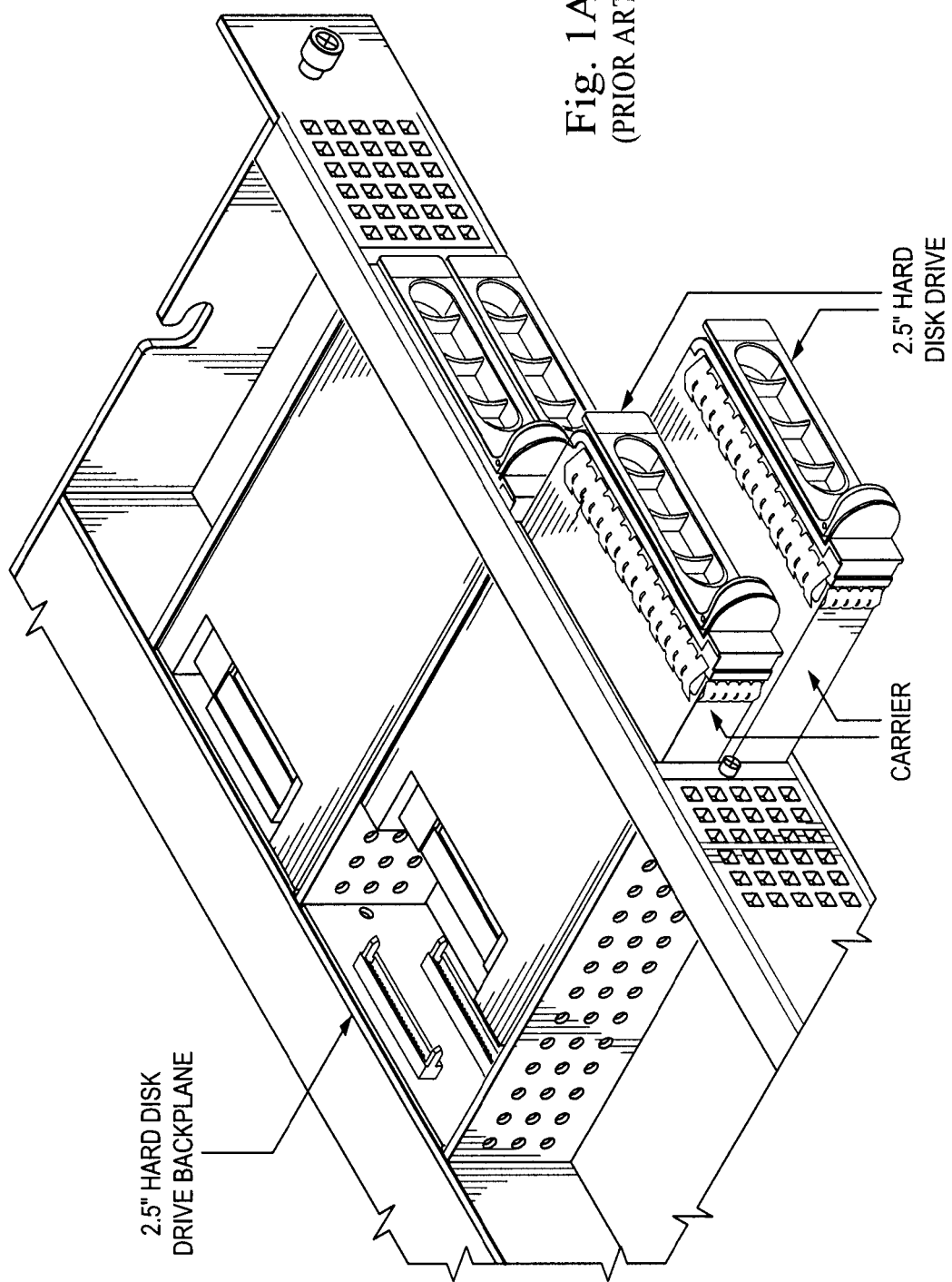
FIGS. 1A and 1B illustrate prior art embodiments for coupling different sized hard disk drives with different backplanes for an information handling system (IHS).
Figure 1B:
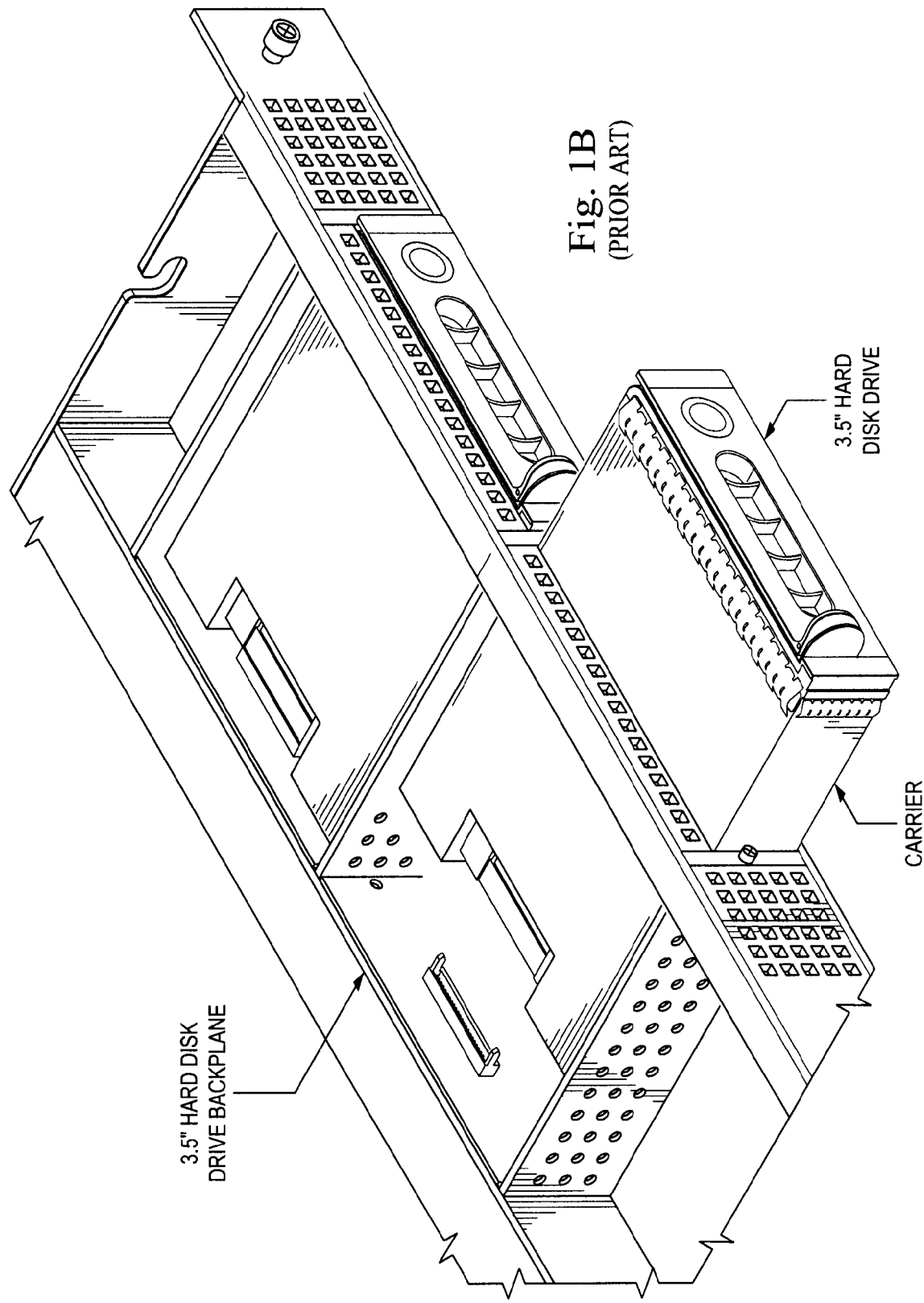

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. Components of the IHS 100 may be coupled with a chassis 101. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

FIG. 2 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116A, 116B, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drives 116 116A, 116B. It is understood that any or all of the drive devices 114, 116A, 116B, and 126 may be located locally with the IHS 100, located remotely from the IHS 100, and/or they may be virtual with respect to the IHS 100.

Not all IHSs 100 include each of the components shown in FIG. 2, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 3A:
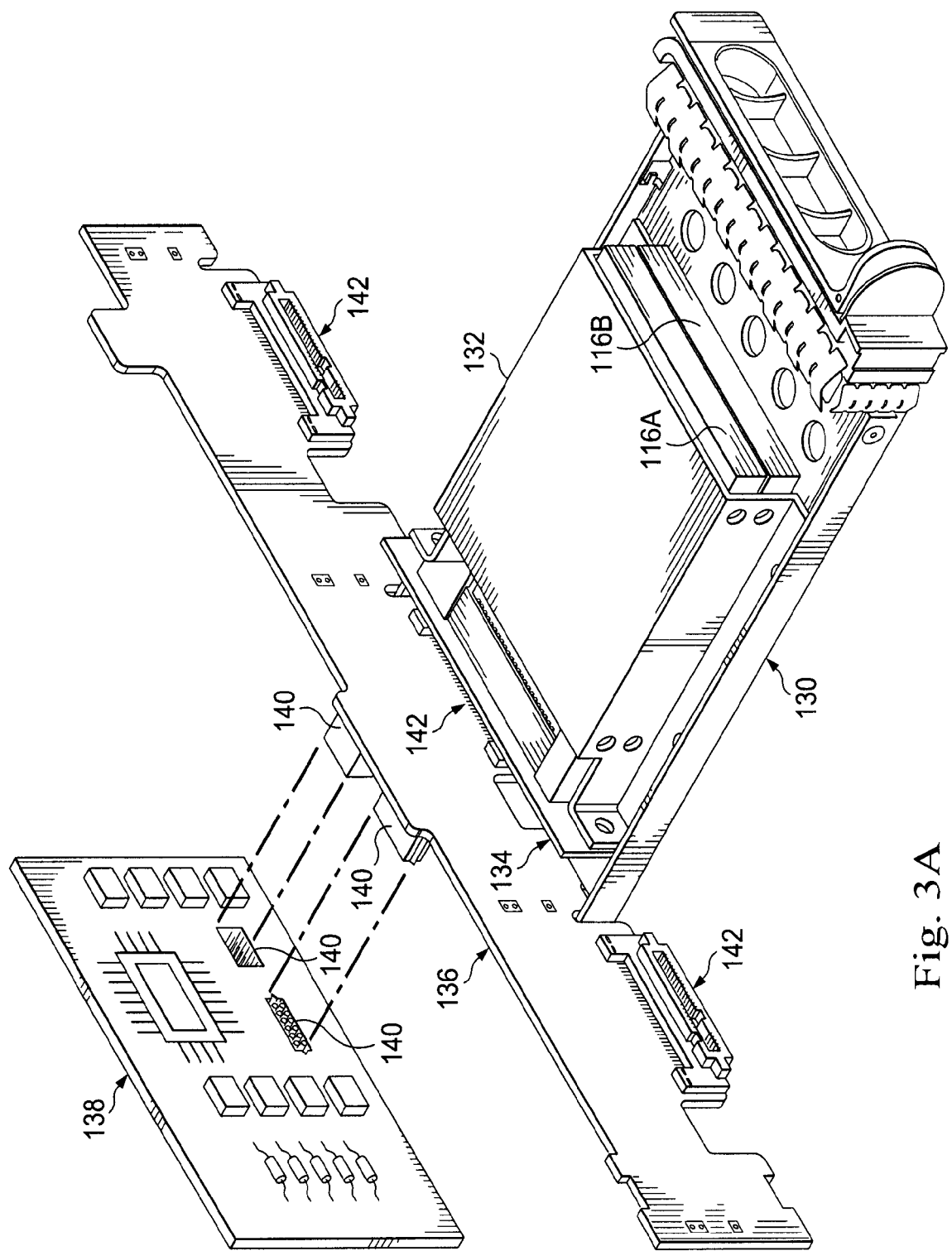
FIGS. 3A and 3B illustrate isometric views of an embodiment of an interposer device to couple multiple data storage devices with a common backplane in an information handling system (IHS).
Figure 3B:
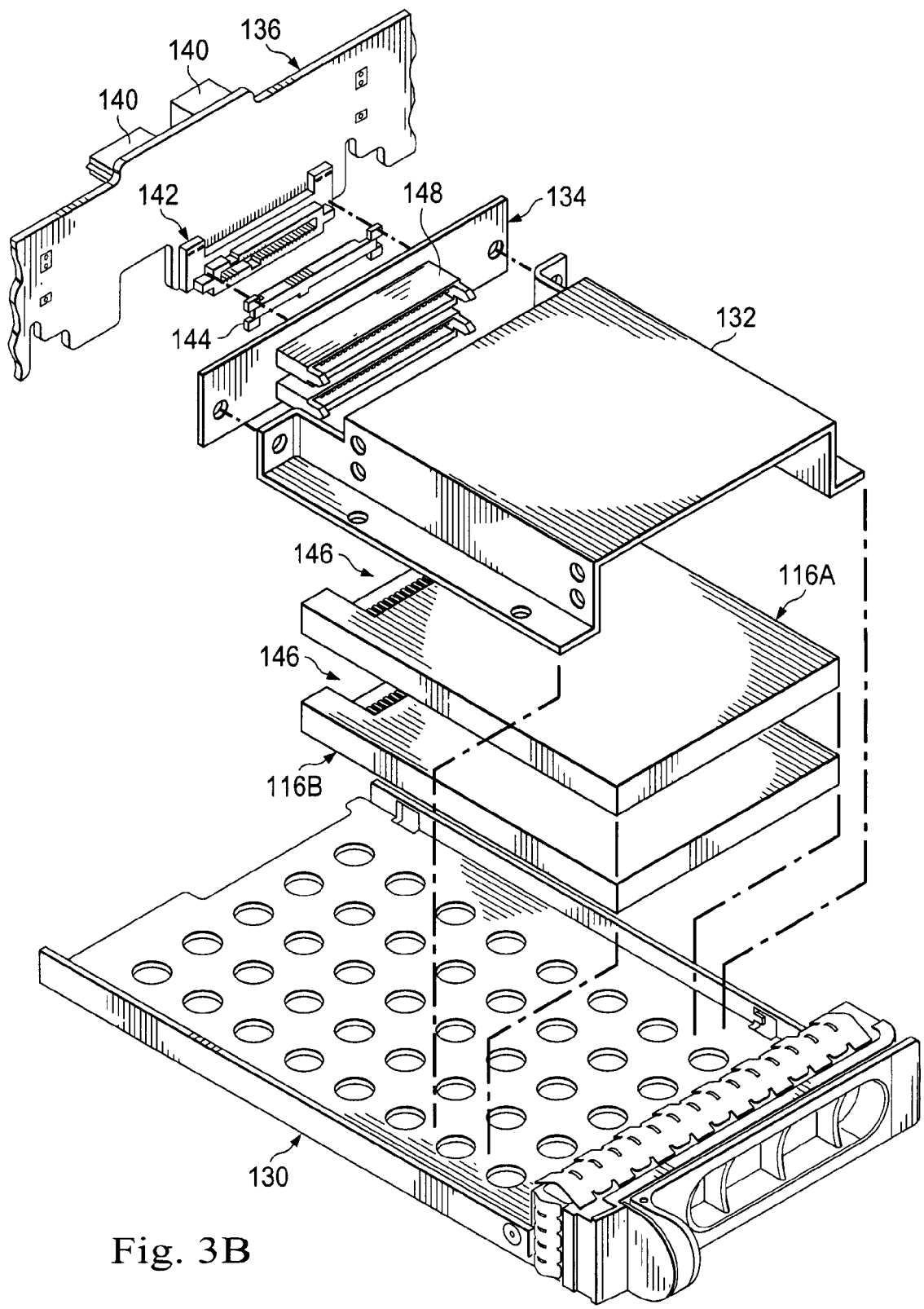

FIGS. 3A and 3B illustrate isometric views of an embodiment of an interposer device 134 to couple multiple data storage devices (e.g., HDDs 116A and 116B) with a common backplane 136 in an IHS 100 chassis 101. It is to be understood that the data storage devices operable with the interposer 134 may be hard disk drives 116A, 116B, solid state drives 126 and/or any other type of data storage device. However, for simplicity, the data storage devices will be referred to as the HDDs 116A and 116B throughout the remainder of this disclosure. In addition, the data storage devices 116A, 116B may be any shape or size. As such, an embodiment contemplated enables the use of 2×2.5" HDDs in place of a single 3.5" HDD using a standard 3.5" HDD carrier frame 130. The two HDDs 116A and 116B may be held to the carrier 130 with a bracket 132 using screws, pins, hooks, or any other type of fastening system. The carrier 130 and the bracket 132 maybe metal plastic or any other suitable material.

As can also be seen in FIGS. 3A and 3B, the carrier 130, holding two or more HDDs 116A and 116B, may be coupled to the backplane 136 using the interposer 134. Then, the backplane 136 may be directly or indirectly coupled with a motherboard 138. The motherboard 138 may include the processor 102, the memory I/O hub 104 and/or other devices or systems.

The backplane 136 couples, directly or indirectly, with the motherboard 138 via one or more connectors 140. The connectors 140 allow communications and/or electrical power to go between the motherboard 138 and the backplane 136. Any type or shape of connector 140 may be used. Similarly, backplane connectors 142 are used to connect one or more HDD assemblies 116A and/or 116*b* with the backplane. The connector 142 is be configured to couple directly with a HDD 116A/116B using the HDD connectors 146 on the HDDs 116A and 116B and also to couple with the HDD 116A/116B using the interposer/backplane connector 144 via the interposer 134. Also, connectors 146 are used to couple the HDDs 116A and 116B with the interposer 134 by mating with connectors 148. It is contemplated that standard HDD and backplane connectors are used with the present disclosure, however, any size and form of connector may be used. Electrical power and/or communication signals may pass through any of the connectors 140, 142, 144, 146 and/or 148.

Figure 4B:
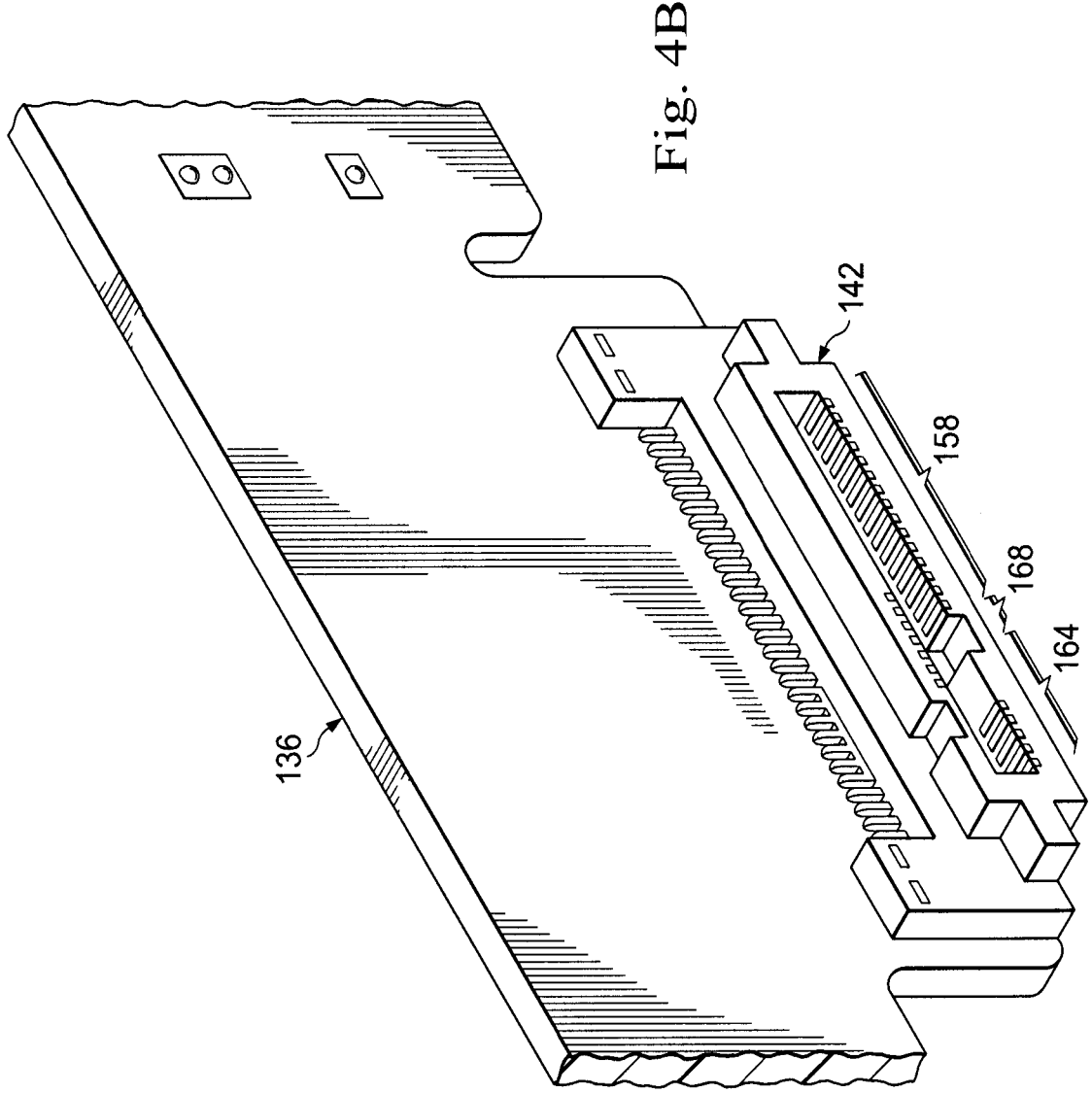

FIGS. 4A and 4B illustrate isometric views of an embodiment of a common backplane 136 used to couple multiple data storage devices 116A and 116B with a motherboard 138 in an IHS 100. As can be seen, the backplane connector 142 provides for a SATA/SAS primary physical link, a SAS secondary physical link, and electrical power. SATA and SAS are well known data transfer communication standards. SATA stands for serial advanced technology attachment and SAS stands for serial attached small computer system interface. The HDDs 116A and/or 116B may be configured as SATA or SAS HDDs. The backplane connector 142 is configured to provide electrical power and data communication pathways from the motherboard 138 and/or other components of the IHS 100 to a HDD 116A or 116B coupling with the HDD connector 146. However, using the interposer 134, one can couple multiple HDDs 116A and 116B to the backplane 136 using a single backplane connector 142. In an embodiment, multiple 2.5" HDDs 116A and 116B are stacked one on top of the other using a standard 3.5" carrier 130. However, it should be understood that the interposer 134 may be configured to accommodate arrangement of the multiple HDDs 116A and 116B to couple with the backplane 136 using a single backplane connector 142.

As can also be seen in FIG. 4B, the backplane connector 142 includes pins for passing SATA/SAS communication signals across the SATA/SAS primary port 164, SAS communication signals across the SAS secondary port 168 and electrical power across the power port 158. The pin-outs for these ports 158, 164 and 168 should be readily understood by one having ordinary skill in the art and are readily supported in the SATA and SAS arts. However, other pin-out configurations are contemplated.

Figure 5:
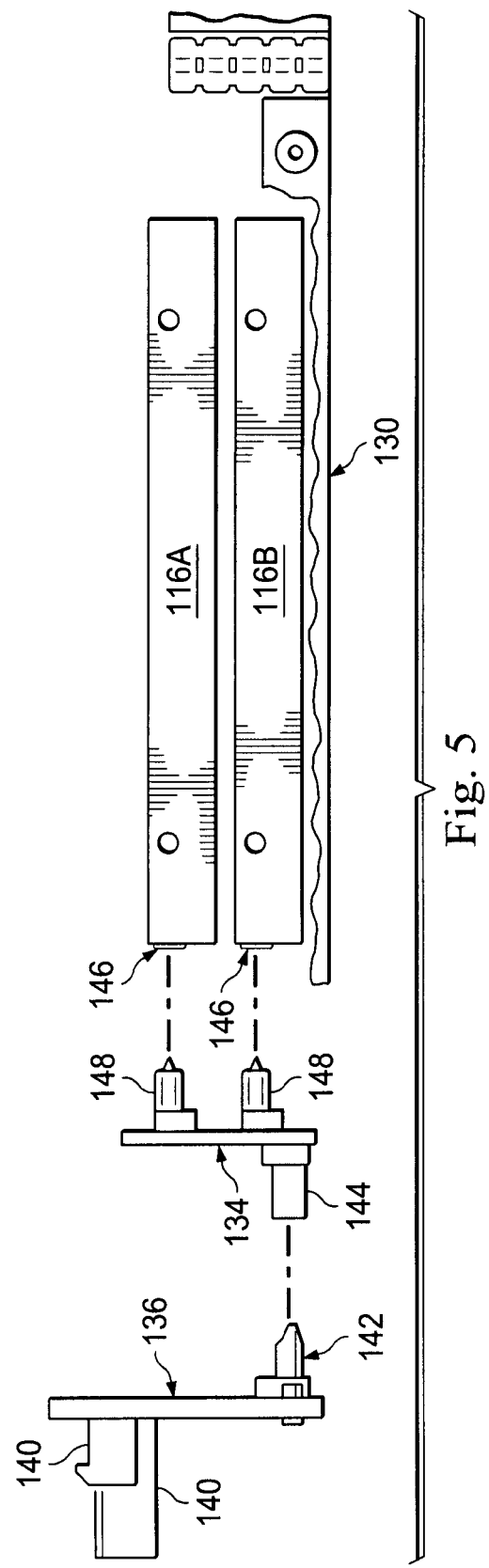
FIG. 5 illustrates an elevation view of an embodiment two data storage devices coupling with backplane using an interposer.

FIG. 5 illustrates an elevation view of an embodiment two data storage devices 116A and 116B coupling with a single backplane pin 142 using an interposer 134. In an embodiment, using two 2.5" HDDs 116A and 116B, the two HDDs 116A and 116B can be stacked together on the carrier 130 and fit into a slot on the chassis 101 of the IHS 100 designed to fit a single 3.5" HDD. The HDD connectors 146 mate with and couple with the interposer/HDD connectors 148 on the interposer 134 for passing electrical power and communications signals. Circuitry is provided on the interposer 134 to pass the electrical power and the communications signals through the interposer/backplane connector 144 to the backplane connector 142 and on to the backplane 136.

FIG. 6 illustrates a block schematic diagram of communications of an embodiment for coupling multiple data storage devices (e.g., HDDs 116A and 116B) with a backplane 136 of an IHS 100 using the interposer 134. When the HDDs 116A and 116B are mated with the interposer 134 and then the interposer 134 is mated with the backplane 136, electrical power 160 is provided from the backplane 136 via the electrical power port 158 and then transferred to both of the HDDs 116A and 116B using the connectors 146 and 148. When the HDDs 116A and 116B are mated with the interposer 134 and then the interposer 134 is mated with the backplane 136, SATA/SAS communication signals 162 are provided to and from the HDD 116A via the primary communication port 164 of the connector 142 and SAS communication signals 166 are provided to and from the HDD 116B via the secondary port 168 of the connector 142. As such, it should be understood that data can be transferred to two HDDs 116A and 116B using primary and secondary ports, respectively. A controller associated with the HDDs 116A and/or 116B determines whether the communications are to follow the SATA protocol or the SAS protocol.

In an embodiment, the present disclosure provides for using existing infrastructure in IHSs 100, such as the Dell Data Center Solutions (DCS) products and other industry standard products, thus allowing for rapid development with minimal impact to existing customers. Thus, one could theoretically double their internal data storage capacity by using the interposer 134 to connect two 2.5" HDDs (e.g., 116A and 116B) in the place of a previous single 3.5" HDD. As shown in the figures, one embodiment of the disclosure includes a 3.5" form factor HDD carrier 130, an interposer board 134, a mounting bracket 132 and a backplane 136. The mounting bracket 132 helps to hold the two HDDs 116A and 116B in place on the carrier 130, but is not required. It is to be understood that the combination of these components provide a carrier assembly with the following properties: (1) This carrier 130 continues to support standard 3.5" SAS and SATA HDDs (in this instance, the interposer and mounting bracket are not needed); and (2) With the use of the interposer board 134, the carrier 130 can now house two—2.5" SAS, SATA and/or SSD HDDS. In another embodiment two—1.8" SAS, SATA or SSD HDDs can also be used.

In summary, the carrier 130 and the bracket 132 may be used to stack-up two HDDs, such as two—2.5" HDDs. The interposer card 134 can collect and allow to pass two HDD communication signals (e.g., 162 and 166) into one SAS connector 142 by utilizing the primary port 164 and the secondary port 168. The SAS connector 144 on interposer card 134 that connects to the backplane 136 connects the signals 162, 166 for the two HDDs 116A and 116B using the connector's primary port 164 and the secondary port 168, respectively. The signals 162, 166 then flow to and from the backplane 136, as shown in FIG. 6.

In a typical backplane 136 design the SAS connector 142 for each HDD can transfer two HDD communication signals. As such, the present disclosure is able to be accomplished using the same backplane 136 for both different sizes of HDDs (e.g., 3.5" HDDs and two—2.5" HDDs). This achieves a higher data storage density (e.g., two—2.5" HDDs) into a slot in the chassis 101 of the IHS 100 using one 3.5" HDD carrier 130. In other words, a 3.5" HDD carrier 130 can install a single 3.5" HDD, or two—2.5 HDDs, using the same backplane 136. By using the same backplane 136 across standard IHS 100 configurations, this disclosure reduces the overhead and development costs and can generally reduce the number of necessary carrier designs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data storage device carrier system comprising:
    a carrier configured to support a single first type data storage device or a plurality of second type data storage devices;
    a backplane including one or more motherboard coupling connectors configured to electrically couple with a motherboard, and including a backplane first type data storage connector configured to couple to a first type data storage device, wherein the backplane is operable to transfer communication signals and electrical power to the backplane first type data storage connector; and
    an interposer board including a plurality of interposer second type data storage connectors that are each operable to couple to a respective second type data storage devices supported by the carrier, and including an interposer first type data storage connector that is configured to couple with the backplane first type data storage connector, wherein the interposer board is operable to provide electrical power from a first port on the backplane first type data storage connector to each of the second type data storage devices through the respective interposer second type data storage connectors, and wherein the interposer board is operable pass communication signals between a second port on the backplane first type data storage connector to a first one of the second type data storage devices through the respective interposer second type data storage connector, and wherein the interposer board is operable to pass communication signals between a third port on the backplane first type data storage connector to a second one of the second type data storage devices through the respective interposer second type data storage connector.

2. The data storage device carrier system of claim 1, wherein the communication signals for one or more of the second type data storage devices are SATA communication signals.

3. The data storage device carrier system of claim 1, wherein the communication signals for one or more of the second type data storage devices are SAS communication signals.

4. The data storage device carrier system of claim 1, wherein one or more of the first type and second type data storage devices is a hard disk drive (HDD).

5. The data storage device carrier system of claim 1, wherein one or more of the first type and second type data storage devices is a solid state drive (SSD).

6. The data storage device carrier system of claim 1, wherein the carrier is configured to support the single first type data storage device that includes a single 3.5" data storage device or the plurality of second type data storage devices that include two stacked 2.5" data storage devices.

7. The data storage device carrier system of claim 1, further comprising:
    a bracket operable to secure the plurality of second type data storage devices to the carrier.

8. An information handling system (IHS) comprising:
    a motherboard including a processor;
    memory coupled with the processor; and
    a data storage device carrier system, wherein the data storage device carrier system comprises:
        a carrier supporting a plurality of second type data storage devices;
        a backplane including one or more motherboard coupling connectors electrically coupled with the motherboard, and including a backplane first type data storage connector configured to couple to a first type data storage device, wherein the backplane is operable to transfer communication signals and electrical power to the backplane first type data storage connector; and
        an interposer board including a plurality of interposer second type data storage connectors that are each coupled to a respective one of the plurality of the second type data storage devices supported by the carrier, and including an interposer first type data storage connector that is coupled with the backplane first type data storage connector, wherein the interposer board is operable to provide electrical power from a first port on the backplane first type data storage connector to each of the second type data storage devices through respective interposer second type data storage connectors, and wherein the interposer board is operable pass communication signals between a second port on the backplane first type data storage connector to a first one of the second type data storage devices through the respective interposer second type data storage connector, and wherein the interposer board is operable to pass communication signals between a third port on the backplane first type data storage connector to a second one of the second type data storage devices through the respective interposer second type data storage connector.

9. The IHS of claim 8, wherein the communication signals for one or more of the second type data storage devices are SATA communication signals.

10. The IHS of claim 8, wherein the communication signals for one or more of the second type data storage devices are SAS communication signals.

11. The IHS of claim 8, wherein one or more of the first type and second type data storage devices is a hard disk drive (HDD).

12. The IHS of claim 8, wherein one or more of the first type and second type data storage devices is a solid state drive (SSD).

13. The IHS of claim 8, wherein the carrier is configured to support a single first type data storage device that includes a single 3.5" data storage device or the plurality of second type data storage devices that include two stacked 2.5" data storage devices.

14. The IHS of claim 8, further comprising:
a bracket securing the plurality of second type data storage devices to the carrier.

15. A method to couple a plurality of data storage devices with a motherboard, the method comprising:
supporting, with a carrier, a plurality of second type data storage devices;
providing a backplane including one or more motherboard coupling connectors electrically coupled with a motherboard, and including a backplane first type data storage connector configured to couple to a first type data storage device, wherein the backplane transfers communication signals and electrical power to the backplane first type data storage connector; and
coupling an interposer first type data storage connector on an interposer board to the backplane first type data storage connector;
coupling the plurality of second type data storage devices supported by the carrier to a respective interposer second type data storage connector on the interposer board;
providing electrical power from a first port on the backplane first type data storage connector, through the interposer board, and to each of the plurality of the data storage devices through respective interposer second type data storage connectors;
passing communication signals from a second port on the backplane first type data storage connector, through the interposer board, and to a first one of the second type data storage devices through the respective interposer second type data storage connector; and
passing communication signals between a third port on the backplane first type data storage connector, through the interposer board, and to a second one of the second type data storage devices through the respective interposer second type data storage connector.

16. The method of claim 15, wherein the communication signals for one or more of the second type data storage devices are SATA communication signals.

17. The method of claim 15, wherein the communication signals for one or more of the second type data storage devices are SAS communication signals.

18. The method of claim 15, wherein one or more of the first type and second type data storage devices is a hard disk drive (HDD).

19. The method of claim 15, wherein one or more of the first type and second type data storage devices is a solid state drive (SSD).

20. The method of claim 15, wherein the carrier is configured to support a single first type data storage device that includes a single 3.5" data storage device or the plurality of second type data storage devices that include two stacked 2.5" data storage devices.

* * * * *